US012671499B2

(12) United States Patent
Sagae et al.

(10) Patent No.: US 12,671,499 B2
(45) Date of Patent: Jun. 30, 2026

(54) OPTICAL TRANSMISSION SYSTEM

(71) Applicant: NTT, Inc., Tokyo (JP)

(72) Inventors: Yuto Sagae, Musashino (JP); Kazuhide Nakajima, Musashino (JP); Takashi Matsui, Musashino (JP); Taiji Sakamoto, Musashino (JP); Ryota Imada, Musashino (JP)

(73) Assignee: NTT, Inc., Tokyo (JP)

( * ) Notice: Subject to any disclaimer, the term of this patent is extended or adjusted under 35 U.S.C. 154(b) by 701 days.

(21) Appl. No.: 18/021,991

(22) PCT Filed: Aug. 21, 2020

(86) PCT No.: PCT/JP2020/031593
§ 371 (c)(1),
(2) Date: Feb. 17, 2023

(87) PCT Pub. No.: WO2022/038765
PCT Pub. Date: Feb. 24, 2022

(65) Prior Publication Data
US 2024/0007189 A1      Jan. 4, 2024

(51) Int. Cl.
H04B 10/291 (2013.01)
G02B 6/02 (2006.01)
H04B 10/25 (2013.01)

(52) U.S. Cl.
CPC ......... H04B 10/2916 (2013.01); H04B 10/25 (2013.01); G02B 6/02042 (2013.01)

(58) Field of Classification Search
CPC ............... H04B 10/2916; H04B 10/25; H04B 10/2507; G02B 6/02042; H04J 14/052
See application file for complete search history.

(56) References Cited

U.S. PATENT DOCUMENTS

| | | | | |
|---|---|---|---|---|
| 2004/0114212 A1* | 6/2004 | Hwang | .................. | H01S 3/302 359/334 |
| 2013/0243381 A1* | 9/2013 | Hayashi | ............. | G02B 6/02266 385/124 |
| 2022/0045755 A1* | 2/2022 | Shukunami | ...... | H04B 10/07953 |

OTHER PUBLICATIONS

P. J. Winzer et al., "Penalties from In-Band Crosstalk for Advanced Optical Modulations Formats", ECOC2011, Tu. 5. B., (2011).

(Continued)

*Primary Examiner* — Matthew Mikels
(74) *Attorney, Agent, or Firm* — Harness, Dickey & Pierce, P.L.C.

(57) ABSTRACT

An object of the present invention is to provide an optical transmission system capable of satisfying XT required by a modulation system even if there is an inter-core loss difference in an MCF.

An optical transmission system of the present invention includes a multi-core optical fiber having a plurality of core regions and having different losses between at least two cores, a forward excitation light source and a multiplexing unit for allowing Raman amplification excitation light to be incident on each core of the multi-core optical fiber in the same direction as signal light, and a backward excitation light source and a multiplexing unit for allowing Raman amplification excitation light to be incident on each core of the multi-core optical fiber in a direction opposite to the signal light, wherein an intensity ratio of the forward excitation light to the backward excitation light is controlled (a ratio of power of excitation light is set to a predetermined value) such that crosstalk (XT) fluctuation between cores is reduced.

2 Claims, 6 Drawing Sheets

(56) References Cited

OTHER PUBLICATIONS

H. Takara et al., "1000—km 7-core fiber transmission of 10×96-Gb/s PDM-16QAM using Raman amplification with 6.5 W per fiber", Opt. EXP. 20. 9. 10100, (2012).

K. Kitamura et al., "Cross-talk Characteristics of a Hybrid Multi-core Fiber Transmission System Using Distributed Raman Amplification", OECC2013 TuS1-3 (2013).

* cited by examiner

OPTICAL TRANSMISSION SYSTEM

CROSS-REFERENCE TO RELATED APPLICATIONS

This application is a 371 U.S. National Phase of International Application No. PCT/JP2020/031593, filed on Aug. 21, 2020. The entire disclosure of the above application is incorporated herein by reference.

TECHNICAL FIELD

The present disclosure relates to an optical transmission system using a multi-core optical fiber having a plurality of optical transmission cores.

BACKGROUND ART

In an optical transmission system using a multi-core optical fiber (MCF), cross talk noise (XT) caused by leakage of light propagating through each core to an adjacent core is one factor causing deterioration in transmission quality. It is known that the influence of XT on the signal quality depends on a modulation system. For example, an optical power penalty is equal to or more than 1 dB when XT at the time of reception (reception XT) is equal to or greater than −16 dB in QPSK modulation and the XT reception is equal to or greater than −24 dB in 16QAM modulation. In this way, an inter-core distance and a core structure of an MCF are designed to satisfy XT required by a modulation method (refer to NPL 1, for example).

CITATION LIST

Non Patent Literature

[NPL 1] P. J. Winzer et al., "Penalties from In-Band Crosstalk for Advanced Optical Modulations Formats," ECOC2011, Tu. 5. B., (2011)

[NPL 2] H. Takara et al., "1000—km 7-core fiber transmission of 10×96-Gb/s PDM-16QAM using Raman amplification with 6.5 W per fiber fiber," Opt. EXP. 20. 9. 10100, (2012)

[NPL 3] K. Kitamura et al., "Cross-talk Characteristics of a Hybrid Multi-core Fiber Transmission System Using Distributed Raman Amplification," OECC2013 TuS1-3 (2013)

SUMMARY OF INVENTION

Technical Problem

However, in an optical transmission system using an MCF, reception XT may deviate from a required designed value due to a transmission loss difference between cores. For example, reception XT may not satisfy XT required by a modulation system because the reception XT varies depending on a production quality deviation and an optical fiber connection quality deviation of each core.

Here, reception XT can be curbed to a required value by amplifying the intensity of an optical signal propagating through cores. For example, study examples of distributed Raman amplification in an optical transmission system using an MCF are shown in NPL 2 and 3. However, NPL 2 and 3 merely show that amplification characteristics are obtained as in the case of an SMF and do not clarify the aforementioned influence on the inter-core characteristic deviation of an MCF.

That is, the cited literature has a problem that how distributed Raman amplification should be applied to an optical transmission system using MCF is not clear.

In order to solve the above problem, an object of the present invention is to provide an optical transmission system capable of satisfying XT required by a modulation system even if there is an inter-core loss difference in an MCF.

Solution to Problem

In order to achieve the above object, an optical transmission system according to the present invention is designed to adjust an intensity ratio of excitation light for distributed Raman amplification which is incident in both directions.

Specifically, the optical transmission system according to the present invention is an optical transmission system including a multi-core optical fiber having different transmission losses between at least two cores among a plurality of cores, a forward excitation light source for allowing Raman amplification excitation light to be incident on each core of the multi-core optical fiber in a same direction as a transmission direction of an optical signal, a backward excitation light source for allowing Raman amplification excitation light to be incident on each core of the multi-core optical fiber in an opposite direction to the transmission direction of the optical signal, wherein, an intensity ratio of the Raman amplification excitation light output from the forward excitation light source to the Raman amplification excitation light output from the backward excitation light source is adjusted such that crosstalk noise on a reception side approaches a designed value.

Even if reception XT deviates from the designed value due to a core loss difference, a variation of the reception XT from the designed value can be curbed by adjusting an intensity ratio of bidirectionally incident excitation lights for distributed Raman amplification within a predetermined range. Therefore, the present invention can provide an optical transmission system capable of satisfying XT required by a modulation system even if there is an inter-core loss difference in an MCF.

A specific adjustment range is as follows.

When the intensity ratio is set to a ratio R of an intensity of the Raman amplification excitation light output from the forward excitation light source to a sum of the intensity of the Raman amplification excitation light output from the forward excitation light source and an intensity of the Raman amplification excitation light output from the backward excitation light source, a transmission loss difference $\Delta\alpha$ between the two cores is adjusted to a range of $0.500+0.179\Delta\alpha-1.52\times10^{-2}/\Delta\alpha\leq R\leq0.500+0.179\Delta\alpha$ when $0$ dB/km$\leq\Delta\alpha\leq0.05$ dB/km, and adjusted to a range of $0.500+0.179\Delta\alpha\leq R\leq0.500+0.179\Delta\alpha-1.52\times10^{-2}/\Delta\alpha$ when $-0.05$ dB/km$\leq\Delta\alpha<0$ dB/km.

Advantageous Effects of Invention

The present invention can provide an optical transmission system capable of satisfying XT required by a modulation method even if there is an inter-core loss difference in an MCF.

DESCRIPTION OF EMBODIMENTS

Embodiments of the present invention will be described with reference to the accompanying drawings. The embodiments described below are examples of the present invention and the present invention is not limited to the following embodiments. Note that constituent elements with the same reference signs in the present description and the drawings are identical to each other.

Figure 1:
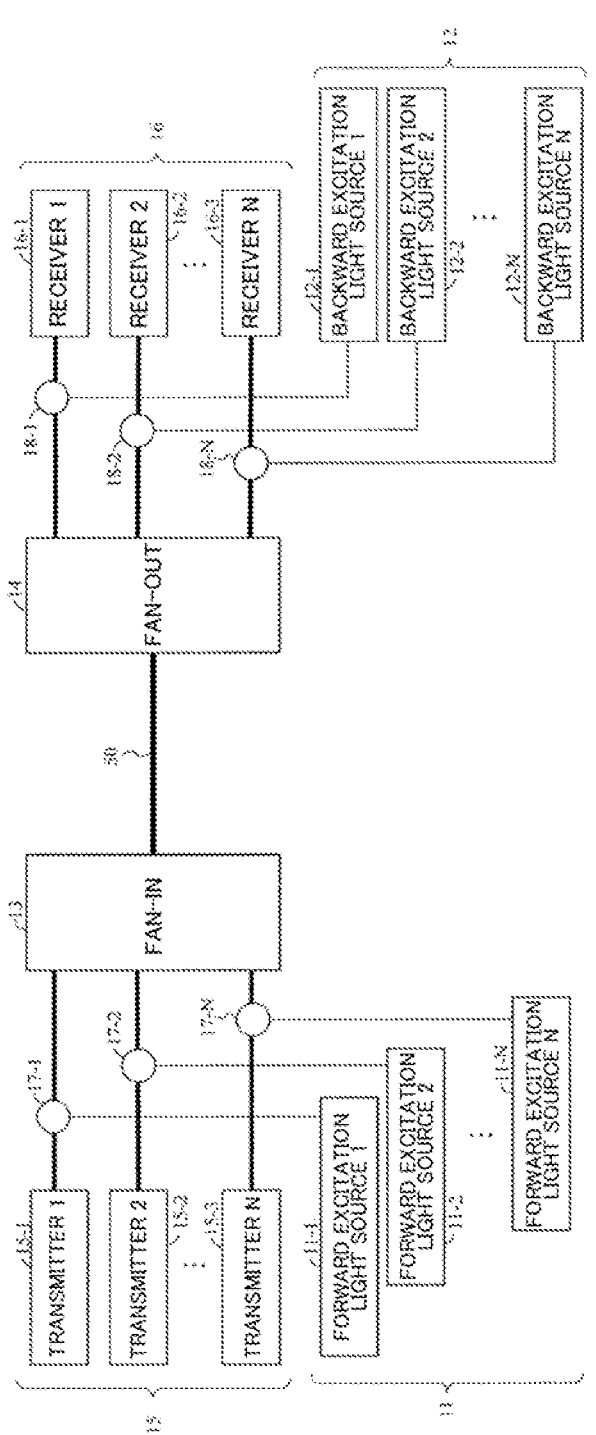
FIG. 1 is a diagram illustrating an optical communication system according to the present invention.

FIG. 1 is a diagram illustrating an optical communication system 301 of the present embodiment. The optical transmission system is an optical transmission system including a multi-core optical fiber 50 having different transmission losses between at least two cores among a plurality of cores, a forward excitation light source 11 that allows Raman amplification excitation light (forward excitation light) to be incident on each core of the multi-core optical fiber 50 in the same direction as a transmission direction of an optical signal, and a backward excitation light source 12 for allowing Raman amplification excitation light (backward excitation light) to be incident on each core of the multi-core optical fiber 50 in a direction opposite to the transmission direction of the optical signal, wherein the intensity ratio of the Raman amplification excitation light output from the forward excitation light source 11 to the Raman amplification excitation light output from the backward excitation light source 12 is adjusted such that crosstalk noise on a reception side approaches a designed value.

The present optical transmission system is a multi-core optical fiber (MCF) optical transmission system using bidirectional distributed Raman amplification. Signal light generated by the same number of transmitters 15 (15-1 to 15-N) as the number of cores of the multi-core optical fiber 50 is incident on N cores of the multi-core optical fiber 50 through a fan-in device 13. At this time, excitation light from the forward excitation light source 11 (11-1 to 11-N) used for forward excitation Raman amplification is multiplexed on a signal light transmission line by a multiplexing unit 17, and distributed Raman amplification is performed on each signal light. The signal light of each core of the multi-core optical fiber 50 extracted by the fan-out device 14 is received by the same number of receivers 16 (16-1 to 16-N) as the number of cores. Further, excitation light from the backward excitation light source 12 (12-1 to 12-N) used for backward excitation Raman amplification is multiplexed on a signal light transmission line by a multiplexing unit 18, and distributed Raman amplification is performed on each signal light.

Figure 2:
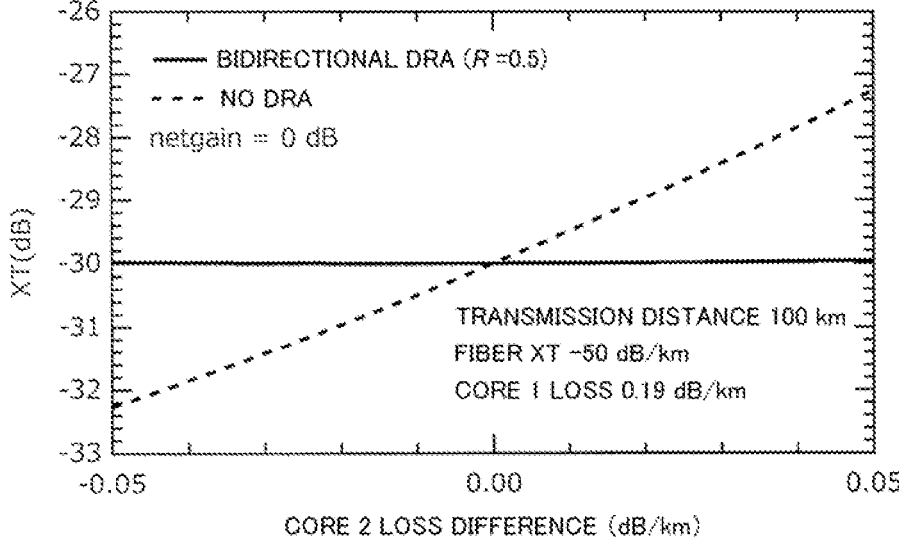
FIG. 2 is a diagram illustrating a relationship between reception XT and an inter-core loss difference.

FIG. 2 is a diagram illustrating loss difference dependence of XT in an optical transmission system having a two-core MCF. It is assumed that a transmission distance is 100 km and XT per unit length of the MCF is designed to be −50 dB/km. Further, it is assumed that the loss per unit length of one core (core 1) is 0.19 dB/km. The loss per unit length of another core (core 2) is changed within a range of ±0.05 dB/km with respect to core 1 (i.e., 0.185 to 0.195 dB/km). In FIG. 2, the vertical axis represents reception XT (dB) and the horizontal axis represents a loss difference (dB/km) of core 2 with respect to core 1.

The broken line indicates dependence of XT at a receiving end (reception XT) on the loss difference of core 2 in the aforementioned range. The reception XT varies from a designed value of −30 dB according to a change in the loss difference of core 2. On the other hand, the solid line indicates reception XT when distributed Raman amplification by bidirectional excitation has been performed. A gain is set such that an incident light intensity when an optical signal is incident on the MCF and a reception light intensity when the optical signal is emitted from the MCF become the same level (netgain=0 dB). It is assumed that the ratio of the intensity of the forward excitation light to the sum of the intensity of the forward excitation light and the intensity of the backward excitation light is R, where R=0.5. FIG. 2 shows that the reception XT becomes equal to the designed value without depending on a change in the loss difference of core 2 by performing bidirectional excitation with R=0.5. The value of R is the same value in all cores.

Although the loss of core 1, which is the reference, is assumed to be 0.19 dB/km here, the same effect can be obtained even with other loss values. Further, although the MCF has two cores, the same applies to three or more cores. Furthermore, although netgain=0 dB, the same effect can be obtained even if netgain is a value other than 0 dB if an incident light intensity is the same as a received light intensity.

Figure 3:
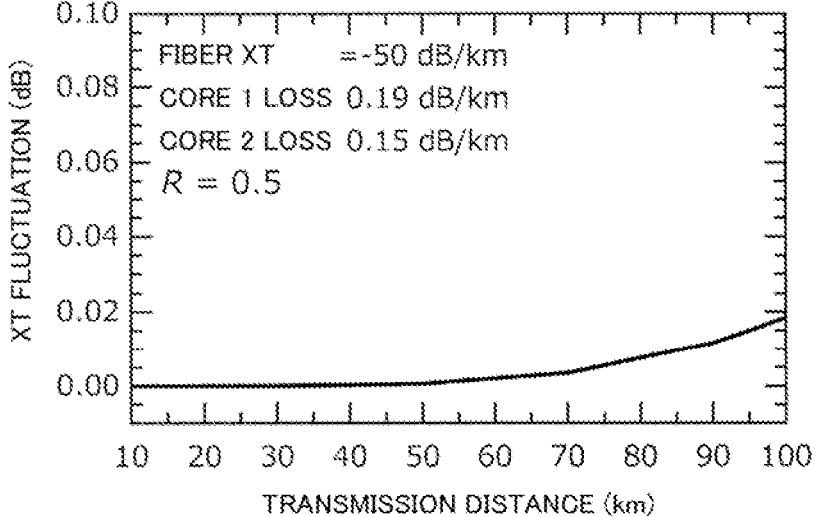
FIG. 3 is a diagram illustrating a relationship between a fluctuation of reception XT from a designed value and a transmission distance in the optical transmission system according to the present invention.

FIG. 3 is a diagram illustrating transmission distance dependence of reception XT. The horizontal axis represents a transmission distance (km) of an MCF and the vertical axis represents a deviation amount (dB) of reception XT from a designed value of the reception XT. Distributed Raman amplification of bidirectional excitation with R=0.5 is performed, and a loss difference between cores is 0.04 dB/km. In any transmission distance of 10 to 100 km, a fluctuation of the reception XT from the designed value is 0.02 dB or less, which has been sufficiently curbed. That is, it is possible to curb deviation of the reception XT from the designed value regardless of the transmission distance by performing distributed Raman amplification in bidirectional excitation like in the optical transmission system.

Figure 4:
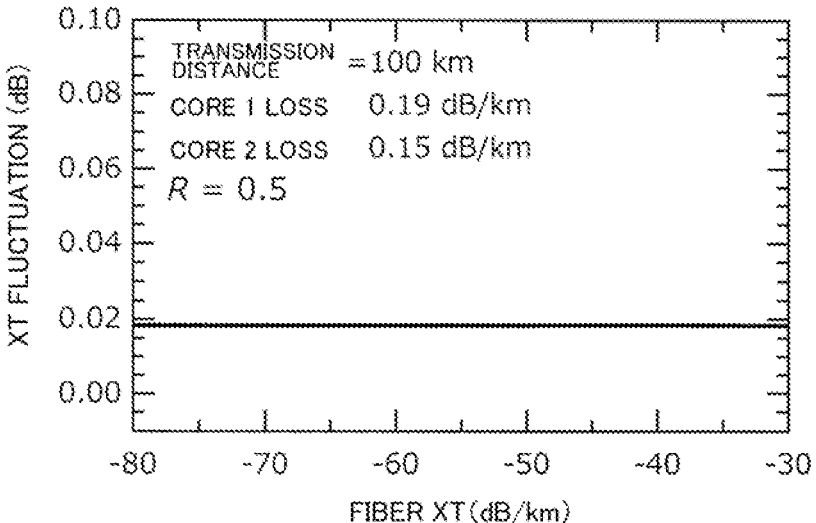
FIG. 4 is a diagram illustrating a relationship between a fluctuation of reception XT from a designed value and crosstalk of an MCF in the optical transmission system according to the present invention.

FIG. 4 is a diagram illustrating dependence of reception XT on fiber XT. The fiber XT is an XT amount per unit distance of an MCF. In FIG. 4, the horizontal axis represents fiber XT (dB/km) and the vertical axis represents a deviation amount (dB) of reception XT from a designed value. Distributed Raman amplification of bidirectional excitation with R=0.5 is performed, and an inter-core loss difference is 0.04 dB/km. Even if the fiber XT of the MCF is any of −80 to −30 dB/km, a fluctuation of the reception XT from the designed value is sufficiently curbed. That is, it is possible to curb deviation of the reception XT from the designed value regardless of the fiber XT of the MCF by performing distributed Raman amplification in bidirectional excitation like the optical transmission system.

Figure 5:
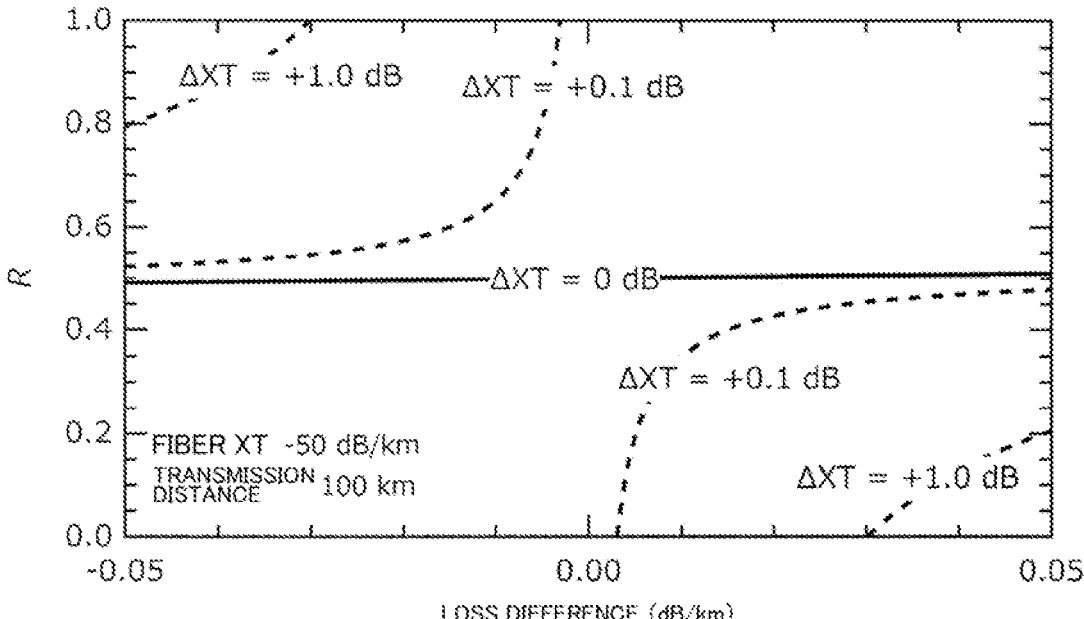
FIG. 5 is a diagram illustrating a relationship between an intensity ratio of excitation light for bidirectional distributed Raman amplification and an inter-core loss difference in the optical transmission system according to the present invention.

FIG. 5 is a diagram illustrating a relationship between a deviation amount $\Delta XT$ of reception XT from a designed value, a value of R, and an inter-core loss difference $\Delta\alpha$. The horizontal axis represents the inter-core loss difference (dB/km) and the vertical axis represents the value of R. The solid line indicates a relationship between R and $\Delta\alpha$, in which $\Delta XT=0$ dB. In addition, the broken line indicates a relationship between R and $\Delta\alpha$, in which $\Delta XT=+0.1$ dB and +1.0 dB.

$R_{+0.1}$ at which the inter-core loss difference $\Delta\alpha$ is within a range of −0.05 to 0.05 dB/km and $\Delta XT$ becomes +0.1 dB can be represented by the following formula.

[Math. 1]

$$R_{+0.1}=0.50+0.179\Delta\alpha-1.54\times10^{-3}/\Delta\alpha \qquad (1)$$

On the other hand, $R_{+1.0}$ at which the inter-core loss difference $\Delta\alpha$ is within a range of −0.05 to 0.05 dB/km and $\Delta XT$ becomes +1.0 dB can be represented by the following formula.

[Math. 2]

$$R_{+1.0}=0.500+0.179\Delta\alpha-1.52\times10^{-2}/\Delta\alpha \qquad (2)$$

Figure 6:
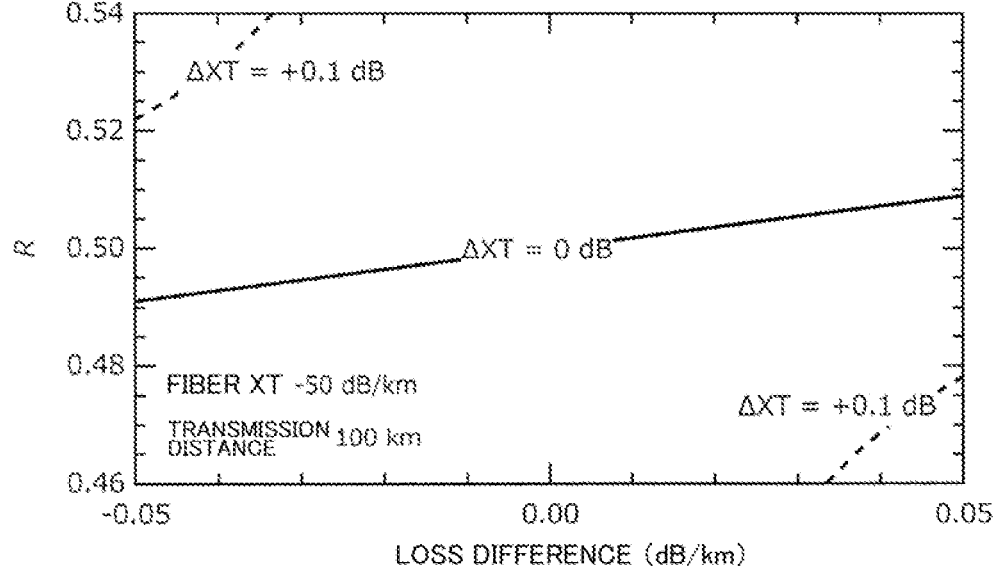
FIG. 6 is a diagram illustrating a relationship between an intensity ratio of excitation light for bidirectional distributed Raman amplification and an inter-core loss difference in the optical transmission system according to the present invention.

FIG. 6 is also a diagram illustrating a relationship between a deviation amount ($\Delta XT$) of reception XT from a designed value, a value of R, and an inter-core loss difference $\Delta\alpha$. FIG. 6 is a diagram particularly paying attention to a relationship between R and $\Delta\alpha$, in which $\Delta XT=0$ dB. $R_{opt}$ at which the inter-core loss difference $\Delta\alpha$ is within a range of −0.05 to 0.05 dB/km and $\Delta XT$ becomes 0 dB can be represented by the following formula.

[Math. 3]

$$R_{opt}=0.500+0.179\Delta\alpha \qquad (3)$$

As described above, when the inter-core loss difference $\Delta\alpha$ of the multi-core optical fiber 50 is within a range of $0<\Delta\alpha\leq0.05$ dB/km, $\Delta XT$ can be curbed to 0 to +1.0 dB by setting R as represented by the following formula.

[Math. 4]

$$0.500+0.179\Delta\alpha-1.52\times10^{-2}/\Delta\alpha\leq R\leq0.500+0.179\Delta\alpha \qquad (4)$$

Further, when the inter-core loss difference $\Delta\alpha$ of the multi-core optical fiber 50 is within a range of $-0.05\leq\Delta\alpha<0$ dB/km, $\Delta XT$ can be curbed to 0 to +1.0 dB by setting R as represented by the following formula.

[Math. 5]

$$0.500+0.179\Delta\alpha\leq R\leq0.50+0.179\Delta\alpha-1.52\times10^{-2}/\Delta\alpha \qquad (5)$$

Advantageous Effects

The present optical transmission system can curb deviation of reception XT from a designed value even if a transmission path is an MCF having an inter-core loss difference.

REFERENCE SIGNS LIST 11, 11-1, 11-2, . . . , 11-N: Forward excitation light source
12, 12-1, 12-2, . . . , 12-N: Backward excitation light sources
13: Fan-in

6

14: Fan-out
15, 15-1, 15-2, . . . , 15-N: Transmitter
16, 16-1, 16-2, . . . , 16-N: Receiver
17, 17-1, 17-2, . . . , 17-N: Multiplexing unit
18, 18-1, 18-2, . . . , 18-N: Multiplexing unit
50: Multi-core optical fiber

The invention claimed is:

1. An optical transmission system comprising:
a multi-core optical fiber having different transmission losses between at least two cores among a plurality of cores;
a forward excitation light source for allowing Raman amplification excitation light to be incident on each core of the multi-core optical fiber in a same direction as a transmission direction of an optical signal; and
a backward excitation light source for allowing Raman amplification excitation light to be incident on each core of the multi-core optical fiber in an opposite direction to the transmission direction of the optical signal,
wherein an intensity ratio of the Raman amplification excitation light output from the forward excitation light source to the Raman amplification excitation light output from the backward excitation light source is adjusted such that crosstalk noise on a reception side approaches a designed value, the crosstalk noise being noise caused by light propagating through each core of the multi-core optical fiber leaking into adjacent cores,
wherein, when the intensity ratio is set to a ratio R of an intensity of the Raman amplification excitation light output from the forward excitation light source to a sum of the intensity of the Raman amplification excitation light output from the forward excitation light source and an intensity of the Raman amplification excitation light output from the backward excitation light source,
a transmission loss difference $\Delta\alpha$ between the two cores is adjusted to a range of $0.500+0.179\Delta\alpha-1.52\times10^{-2}/\Delta\alpha\leq R\leq0.500+0.179\Delta\alpha$ when $0$ dB/km$<\Delta\alpha\leq0.05$ dB/km, and adjusted to a range of $0.500+0.179\Delta\alpha\leq R\leq0.500+0.179\Delta\alpha-1.52\times10^{-2}/\Delta\alpha$ when $-0.05$ dB/km$\leq\Delta\alpha<0$ dB/km.

2. An optical transmission system comprising:
a multi-core optical fiber having different transmission losses between at least two cores among a plurality of cores;
a forward excitation light source for allowing Raman amplification excitation light to be incident on each core of the multi-core optical fiber in a same direction as a transmission direction of an optical signal; and
a backward excitation light source for allowing Raman amplification excitation light to be incident on each core of the multi-core optical fiber in an opposite direction to the transmission direction of the optical signal,
wherein an intensity ratio of the Raman amplification excitation light output from the forward excitation light source to the Raman amplification excitation light output from the backward excitation light source is adjusted such that crosstalk noise on a reception side approaches a designed value,
wherein, when the intensity ratio is set to a ratio R of an intensity of the Raman amplification excitation light output from the forward excitation light source to a sum of the intensity of the Raman amplification excitation light output from the forward excitation light source and an intensity of the Raman amplification excitation light output from the backward excitation light source, a transmission loss difference $\Delta\alpha$ between the two cores is adjusted to a range of $0.500+0.179\Delta\alpha-1.52\times10^{-2}/\Delta\alpha \leq R \leq 0.500+0.179\Delta\alpha$ when $0$ dB/km$<\Delta\alpha\leq0.05$ dB/km, and adjusted to a range of $0.500+0.179\Delta\alpha \leq R \leq 0.500+0.179\Delta\alpha-1.52\times10^{-2}/\Delta\alpha$ when $-0.05$ dB/km$\leq\Delta\alpha<0$ dB/km.

* * * * *